US011197463B2

(12) United States Patent
Burton et al.

(10) Patent No.: US 11,197,463 B2
(45) Date of Patent: Dec. 14, 2021

(54) ELECTRONIC AND AUTOMATIC PET DOOR

(71) Applicants: Lauren Burton, Burbank, CA (US); Patrick Burton, Burbank, CA (US)

(72) Inventors: Lauren Burton, Burbank, CA (US); Patrick Burton, Burbank, CA (US)

(73) Assignee: Dog-E-Door, LLC, Burbank, CA (US)

( * ) Notice: Subject to any disclaimer, the term of this patent is extended or adjusted under 35 U.S.C. 154(b) by 285 days.

(21) Appl. No.: 16/149,038

(22) Filed: Oct. 1, 2018

(65) Prior Publication Data

US 2019/0098874 A1 Apr. 4, 2019

Related U.S. Application Data

(60) Provisional application No. 62/567,467, filed on Oct. 3, 2017.

(51) Int. Cl.
*A01K 29/00* (2006.01)
*A01K 1/00* (2006.01)
*G05B 19/042* (2006.01)
*A01K 5/02* (2006.01)

(52) U.S. Cl.
CPC ............. *A01K 29/005* (2013.01); *A01K 1/00* (2013.01); *A01K 5/02* (2013.01); *G05B 19/042* (2013.01); *G05B 2219/2628* (2013.01)

(58) Field of Classification Search
CPC ............................. A01K 1/0017; A01K 1/0023
See application file for complete search history.

(56) References Cited

U.S. PATENT DOCUMENTS

| | | | | |
|---|---|---|---|---|
| 5,651,331 A | * | 7/1997 | Cleri, Jr. ............... | A01K 1/035 119/484 |
| 6,560,926 B1 | * | 5/2003 | Gillett .................. | E06B 7/32 49/169 |
| 6,864,914 B1 | * | 3/2005 | Birk ..................... | A01K 29/005 348/14.03 |
| 8,020,519 B2 | | 9/2011 | Stamper | |
| 8,464,663 B2 | * | 6/2013 | Kodat ................... | A01K 15/02 119/484 |
| 8,967,085 B2 | * | 3/2015 | Gillis ................... | A01K 15/021 119/721 |
| 9,157,269 B2 | | 10/2015 | Brown | |
| 9,472,032 B2 | * | 10/2016 | Litterer ................ | A01K 29/00 |
| 2006/0252366 A1 | * | 11/2006 | Eu ........................ | E06B 7/32 455/3.06 |
| 2008/0036611 A1 | * | 2/2008 | Noblitt .................. | E05F 15/77 340/573.3 |
| 2012/0272902 A1 | * | 11/2012 | Hofman ................ | A01J 7/04 119/14.02 |
| 2013/0068172 A1 | * | 3/2013 | Hoegh .................. | A01K 1/034 119/481 |

(Continued)

*Primary Examiner* — Magdalena Topolski
*Assistant Examiner* — Arfan Y. Sinaki
(74) *Attorney, Agent, or Firm* — Fish IP Law, LLP

(57) ABSTRACT

In a pet door system designed to allow a user to control a pet door to manage access inside and outside of a space, a speaker that plays a first phrase in response to a first trigger. The pet door system comprises at least a sensor, a pet door, and a door opener. The sensor detects a pet entering an area about the pet door in response to the first phrase. The door opener opens a pet door when the sensor detects the pet entering the area about the pet door.

18 Claims, 6 Drawing Sheets

(56) References Cited

U.S. PATENT DOCUMENTS

| | | | |
|---|---|---|---|
| 2013/0319337 A1* | 12/2013 | Davis | A01K 15/021 |
| | | | 119/57.1 |
| 2016/0198685 A1* | 7/2016 | Huffhines | A01K 31/02 |
| | | | 119/436 |
| 2017/0290290 A1* | 10/2017 | Trottier | A01K 5/02 |
| 2018/0303062 A1* | 10/2018 | Simard | A01K 15/021 |
| 2020/0245590 A1* | 8/2020 | Hill | G06K 7/10178 |

* cited by examiner

ELECTRONIC AND AUTOMATIC PET DOOR

This application claims priority to Provisional Application Ser. No. 62/567,467 filed on Oct. 3, 2017. These and all other extrinsic materials identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is pet door systems

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Pet doors allow pets to freely move between inside and outside of a home without the owner having to manually open or close a door. These traditional pet doors have been widely used by many households for years. However, there are frequently instances where an individual needs to restrict their animal from using the pet door, including but not limited to, at night or when there is bad weather. The act of restricting or enabling access through a traditional pet door requires an individual to both be present and exert physical effort (the manner of this physical effort is dependent on the nature of the traditional pet door). This requirement is inconvenient for both the human and their pet(s).

U.S. Pat. No. 8,020,519 to Stamper teaches a chicken coop door that opens at a given time and closes at a given time, allowing chickens to roam free during a specified time period, and stay warm and safe during another specified time period. Stamper's system, however, requires the chickens to leave the coop during the "door open" time period, and to automatically return to the coop before the "door close" time period. Not all animals roam and come back home according to such a strict schedule.

U.S. Pat. No. 9,157,269 to Brown teaches an automatic smart door that is controlled by a smart phone application. The smart phone application can open the door for a time period, and can even open a door and automatically close the door after a pet traverses the door. Brown's pet door can also have a camera that can be accessed and controlled remotely via the smart phone application so that a user can view the pet and ascertain its location. Brown's pet door system, however, fails to allow a pet door to interact more with a pet, which is sometimes required to summon a pet to walk through a door.

Therefore a need exists for a novel interactive pet door system.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

In view of the foregoing disadvantages inherent in the known types of pet doors now present in the prior art, the present invention provides a new type of electronic pet door which allows the user to control and manage their pet door's settings—to remotely open, close, or set a predetermined time for such to occur—utilizing various communication devices or directly on the door.

The Wi-Fi enabled, electronic pet door system, according to the present invention substantially departs from the conventional concepts and designs of the prior art, and in so doing provides a new pet access system in which the user has control over the electronic pet door and the ability to open, close or pre-set unlock and lock times remotely using their smart device or directly on the door. Accordingly, the present invention substantially departs from the conventional concepts and designs of the prior art, and in so doing provides an apparatus primarily developed for the purpose of providing the user the ability to configure the dog door to automatically open or close or base this on a set time from a smart device, and in so doing grants the user complete control no matter the location.

What's more, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

The smart pet door provides more options, greater control and convenience over door access than currently available pet doors. In one aspect, the Wi-Fi compatibility may be used as a means to control your pet door remotely to either open the door in the morning so the owner does not have to physically get out of bed to open it, close the door once it gets dark or set a time for these events to occur daily. The system and methods provided allow the owner or user to feel confident in knowing the door is closed once it gets dark and their animal is not outside vulnerable to predators, especially if they are not home to manually close the pet door. Additionally, the system has the flexibility to not only keep a pet safe at night and inside the home if the pet owner couldn't get home before it becomes dark outside, but allows the user to set a time for it to open in the morning so that the pet can go outside early in the morning without waking the owner up.

The general purpose of the present invention, which will be described subsequently in greater detail, is to provide a remotely controllable pet door. Often, controlled appliances can be manipulated using remote control units and/or control panels. Further, a computer executing appliance automation software can also centrally regulate the controlled device. Thus, the device may be accessible and managed from a hand held device via a smart phone app. To attain this, the present invention generally comprises a communication system for controlling access to the user's pet door from anywhere via the users smart phone, android, iOS and/or laptop device to remotely close, open, or set daily times for the pet door.

The device, which can be used with any type of door, including glass sliding doors, is provided. In some embodiments, the device may include a door wherein the embodiment is framed into the door, along with a processing unit, and a door movable between an open position and a closed position by a door motivator that is coupled to the door. The device may include a vertically sliding pet door equipped with a power source for supplying electric power to the device. The operating mechanism is a motor, which lifts the door open.

In one aspect, the system may connect with smart home platforms and will extend a user's smart home to protect and look after their pet. Such systems may be programmed to allow the pet door to be locked, unlocked or closed off at predetermined times, regardless of whether the premise is occupied.

A further object is to provide a communication system with interchangeable overlays that are programmable. The device may allow the pet door to be controlled from a central location in the premises, or multiple locations; or allow control over its function via a remote connection such as a cellular modem or Internet connection. Furthermore, the system and methods provided enable a pet access door to be opened and closed without requiring user input. A client device may be in communication with the pet door access device, and the client device may be configured to provide input to the pet door access device to control the moving of the door between an open position and a closed position. This automatic, smart pet door can be individually addressed, controlled, and wirelessly monitored, from any mainstream communications device, such as a cellular or mobile smart phone, tablet, laptop, or desktop computer.

In another aspect, a device may comprise, a remote communication system, and the like can be utilized to wirelessly control the operation of the wireless pet door; thus, a remote control switch can be positioned at a desired location without being hard-wired and can transmit commands that effectuate modifying operation of the wireless pet door.

Optionally, the pet door access device may further include: a camera module configured to record images of an area proximate to the door; a pet sensor configured to determine which side of the door a pet is on; a speaker configured to output audio data; a light element configured to illuminate an area proximate to the door; and/or an alarm module configured to provide an alarm if the door is forced open. In one embodiment, the application will save a daily video recording containing a 30 second interval before the door is set to close wherein the user can access these video recordings and view a pet's actions later.

The pet door access device can comprise a video camera that provides a means of viewing the door and the environment proximate to the door. Additionally, the video camera can also be connected to a software application that can interface with the video camera to provide added software-based functionality.

Software functionality can include, for example, streaming data of substantially real-time views of the door and the environment surrounding the door by recording at all times and/or recording intermittently to allow a user to get brief video clips of the situation based on one or more parameters.

It is contemplated that the video camera can be separate component of an overall interactive pet door system or can be combined with any one or more components of the interactive pet door system. It is further contemplated that the video camera can store recorded video in any storage medium and using any storage method known in the art. For example, video captured by the video camera can be stored internally in a volatile and/or non-volatile memory storage medium. In another example, video captured by the video camera can be stored remotely through a network to a remote server, such as a remote server over a cloud computing network or through a hard-wired network.

In another optional aspect of the invention, the pet door access device can comprise a motion detector. The motion detector can be operatively coupled to one or more components of the pet door access device to provided added functionality. For example, the motion detector can be coupled to a video camera and a light which are substantially simultaneously activated upon the detection of movement by the motion detector.

It is contemplated that the motion detector can be activated according to various criteria, including, for example, a height restriction that singles out pets rather than capturing human activity.

These and other features and advantages are evidenced from the following description of the present invention, with reference to the accompanying drawings.

Various objects, features, aspects and advantages of the inventive subject matter will become more apparent from the following detailed description of preferred embodiments, along with the accompanying drawing figures in which like numerals represent like components.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

BRIEF DESCRIPTION OF THE DRAWING

Some embodiments of the present invention are illustrated as an example and are not limited by the figures of the accompanying drawings, in which like references may indicate similar elements and in which.

DETAILED DESCRIPTION

Figure 1:
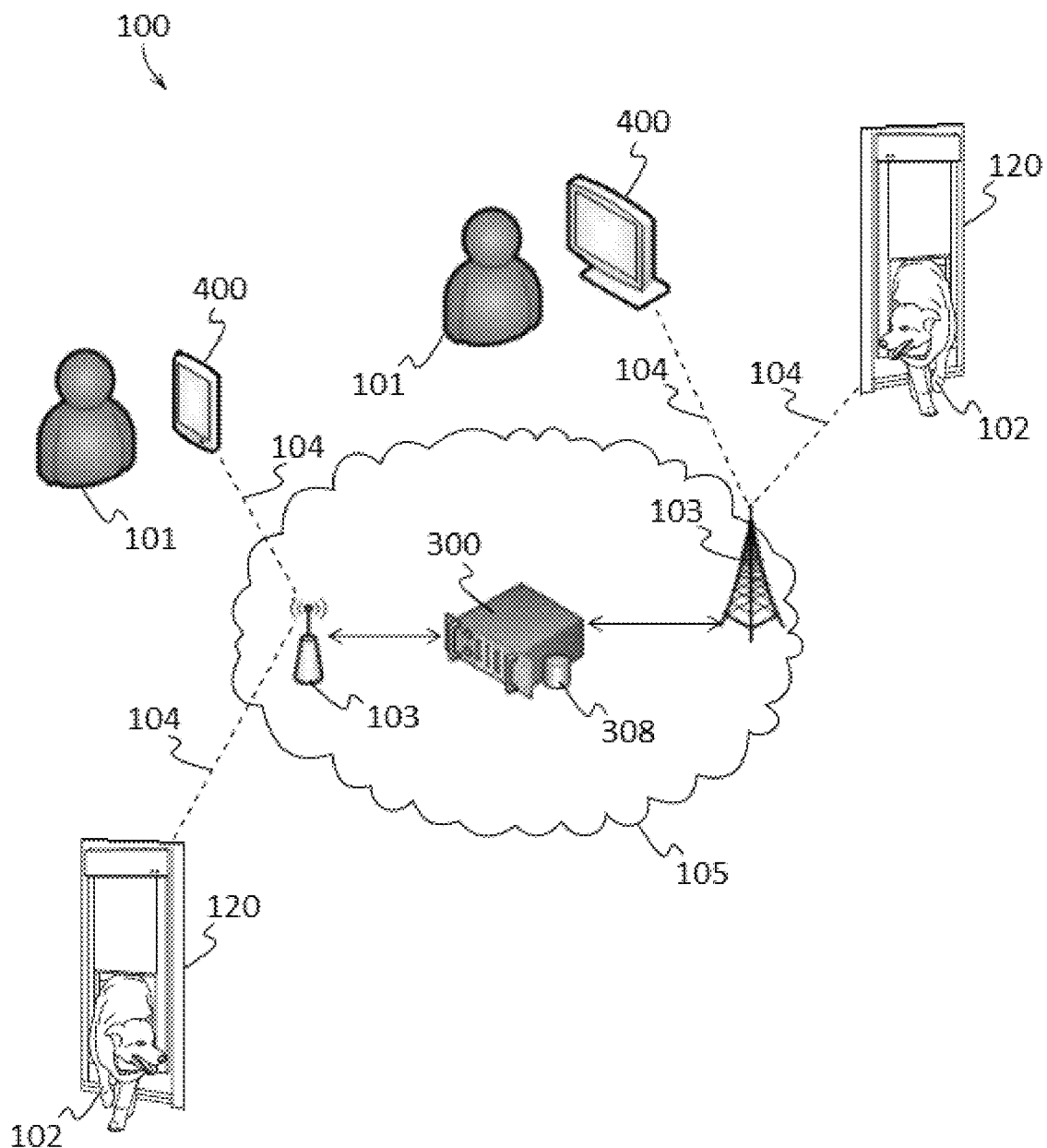
FIG. 1 shows an illustrative example of some of the components and computer implemented methods, which may be found in a system according to various embodiments described herein.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A new pet access system and methods are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. As perhaps best shown by FIG. 1, an illustrative example of some of the physical components which may comprise a pet access system ("the system") 100 according to some embodiments is presented. The system 100 is configured to facilitate the transfer of data and information between one or more access points 103, pet access door devices 120, client devices 400, and servers 300 over a data network 105. Each client device 400 may send data to and receive data from the data network 105 through a network connection 104 with an access point 103. A data store 308 accessible by the server 300 may contain one or more databases.

In this example, the system 100 comprises at least one client device 400 (but preferably more than two client devices 400) configured to operate by one or more users 101. Client devices 400 can be mobile devices, such as laptops, tablet computers, personal digital assistants, smart phones, and the like, that are equipped with a wireless network interface capable of sending data to one or more servers 300 with access to one or more data stores 308 over a network 105 such as a wireless local area network (WLAN). Additionally, client devices 400 can be fixed devices, such as desktops, workstations, and the like, that are equipped with a wireless or wired network interface capable of sending data to one or more servers 300 with access to one or more data stores 308 over a wireless or wired local area network 105. The present invention may be implemented on at least one client device 400 and/or server 300 programmed to perform one or more of the steps described herein. In some embodiments, more than one client device 400 and/or server 300 may be used, with each programmed to carry out one or more steps of a method or process described herein.

In some embodiments, the system 100 may be configured to facilitate the communication of information to and from one or more users 101, through their respective client devices 400, pet access door device 120, and servers 300 of the system 100. Users 101 of the system 100 may include pet owners or individuals that care for a pet 102 (FIG. 5) who desire to enable the pet to enter and exit a building, such as a home, via a pet access door device 120.

Figure 2:
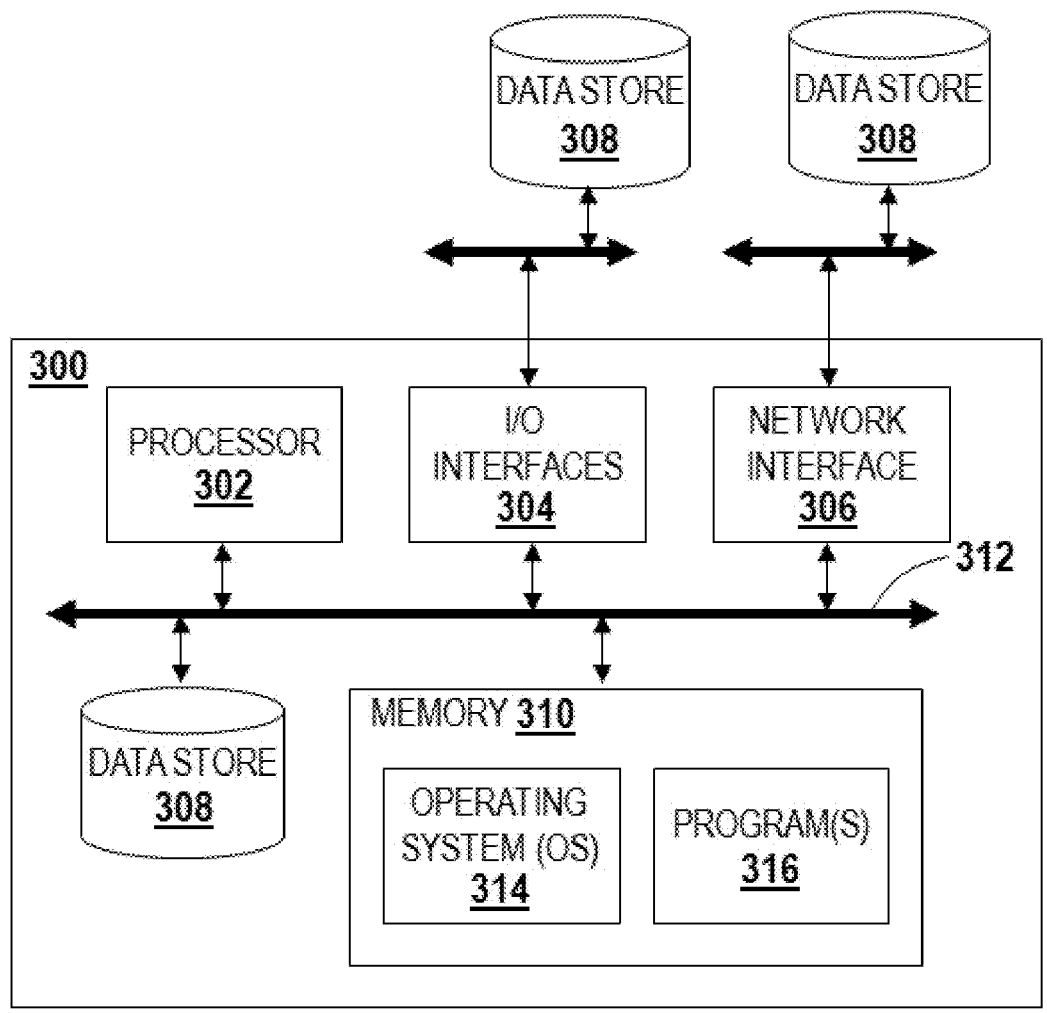
FIG. 2 illustrates a block diagram showing an example of a server, which may be used by the system as described in various embodiments herein.

Referring now to FIG. 2, in an exemplary embodiment, a block diagram illustrates a server 300 of which one or more may be used in the system 100 or standalone and which may be a type of computing platform. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 2 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the data network 105, the enterprise, and the like, etc. The network interface 306 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n). The network interface 306 may include address, control, and/or data connections to enable appropriate communications on the network. A data store 308 may be used to store data.

The data store 308 is a type of memory and may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (O/S) 314 and one or more programs 316.

The operating system 314 essentially controls the execution of other computer programs, such as the one or more programs 316, and provides scheduling, input-output control, file and data management, memory management, and communication control and related services. The operating system 314 may be, for example Windows NT, Windows 2000, Windows XP, Windows Vista, Windows 7, Windows 8, Windows 10, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C. and various other vendors), Android and variants thereof (available from Google, Inc. of Mountain View, Calif.), Apple OS X and variants thereof (available from Apple, Inc. of Cupertino, Calif.), or the like.

The one or more programs 316 can include one or more engines, such as a rules engine and an instructional engine, which may be configured to implement the various processes, algorithms, methods, techniques, etc. described herein.

Figure 3:
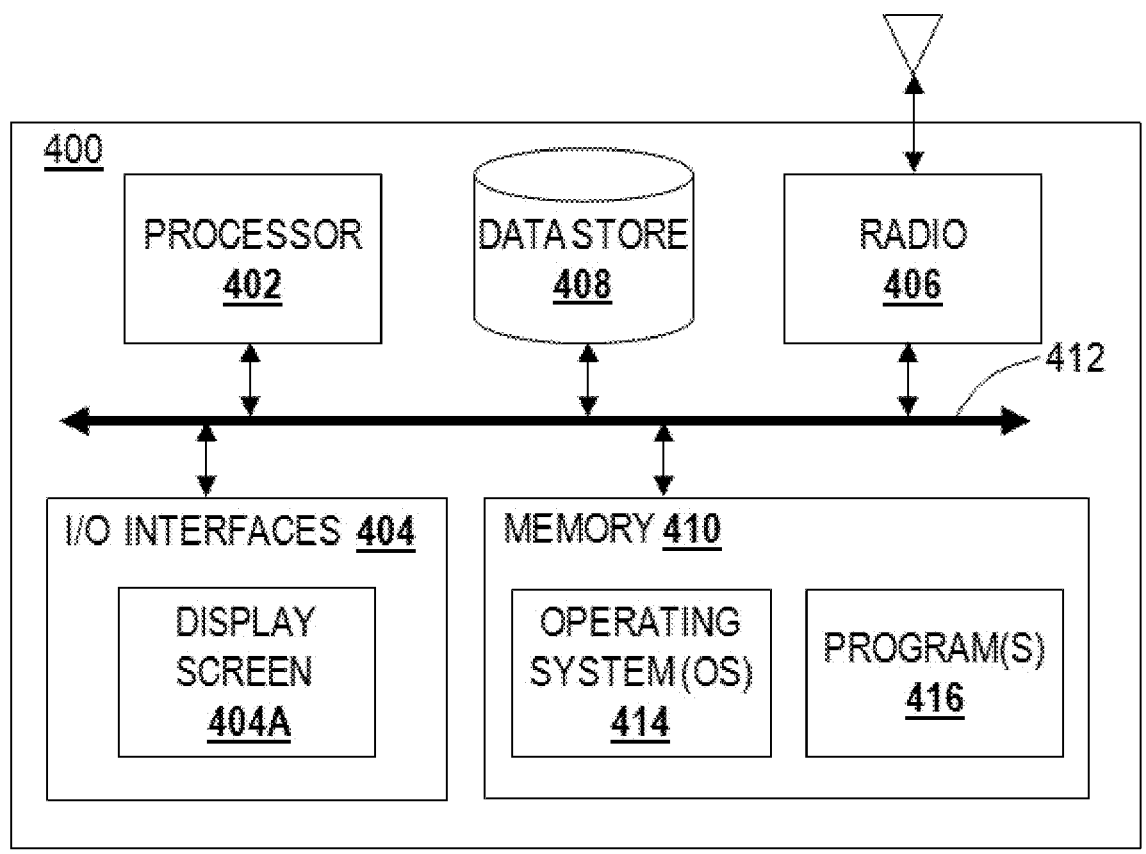
FIG. 3 depicts a block diagram illustrating an example of a client device that may be used by the system as described in various embodiments herein.

Referring to FIG. 3, in an exemplary embodiment, a block diagram illustrates a client device 400 of which one or more may be used in the system 100 or the like and which may be a type of computing platform. The client device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 3 depicts the client device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the client device 400, a semiconductor-based microprocessor (in the form of a microchip or chip set), or generally any device for executing software instructions. When the client device 400 is in operation, the processor 402 is configured to execute software stored within the memory 410, to communicate data to and from the memory 410, and to generally control operations of the client device 400 pursuant to the software instructions. In an exemplary embodiment, the processor 402 may include a mobile optimized processor such as optimized for power consumption and mobile applications.

The I/O interfaces 404 can be used to receive data and user input and/or for providing system output. User input can be provided via a plurality of I/O interfaces 404, such as a keypad, a touch screen, a camera, a microphone, a scroll ball, a scroll bar, buttons, bar code scanner, voice recognition, eye gesture, and the like. System output can be provided via a display screen 404A such as a liquid crystal display (LCD), touch screen, and the like. The I/O interfaces 404 can also include, for example, a global positioning service (GPS) radio, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the client device 400. Additionally, the I/O interfaces 404 may be used to output notifications to a user and can include a speaker or other sound emitting device configured to emit audio notifications, a vibrational device configured to vibrate, shake, or produce any other series of rapid and repeated movements to produce haptic notifications, and/or a light emitting diode (LED) or other light emitting element which may be configured to illuminate to provide a visual notification.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 408 may be used to store data and is therefore a type of memory. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs 420, each of which includes an ordered listing of executable instructions for implementing logical functions. In the example of FIG. 3, the software in the memory system 410 includes a suitable operating system (O/S) 414 and programs 416.

The operating system 414 essentially controls the execution of other computer programs, and provides scheduling, input-output control, file and data management, memory management, and communication control and related services. The operating system 414 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like.

The programs 416 may include one or more applications, such as a communication application and various applications, add-ons, etc. configured to provide end user functionality with the client device 400. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network 105 to manipulate information of the system 100.

Figure 4:
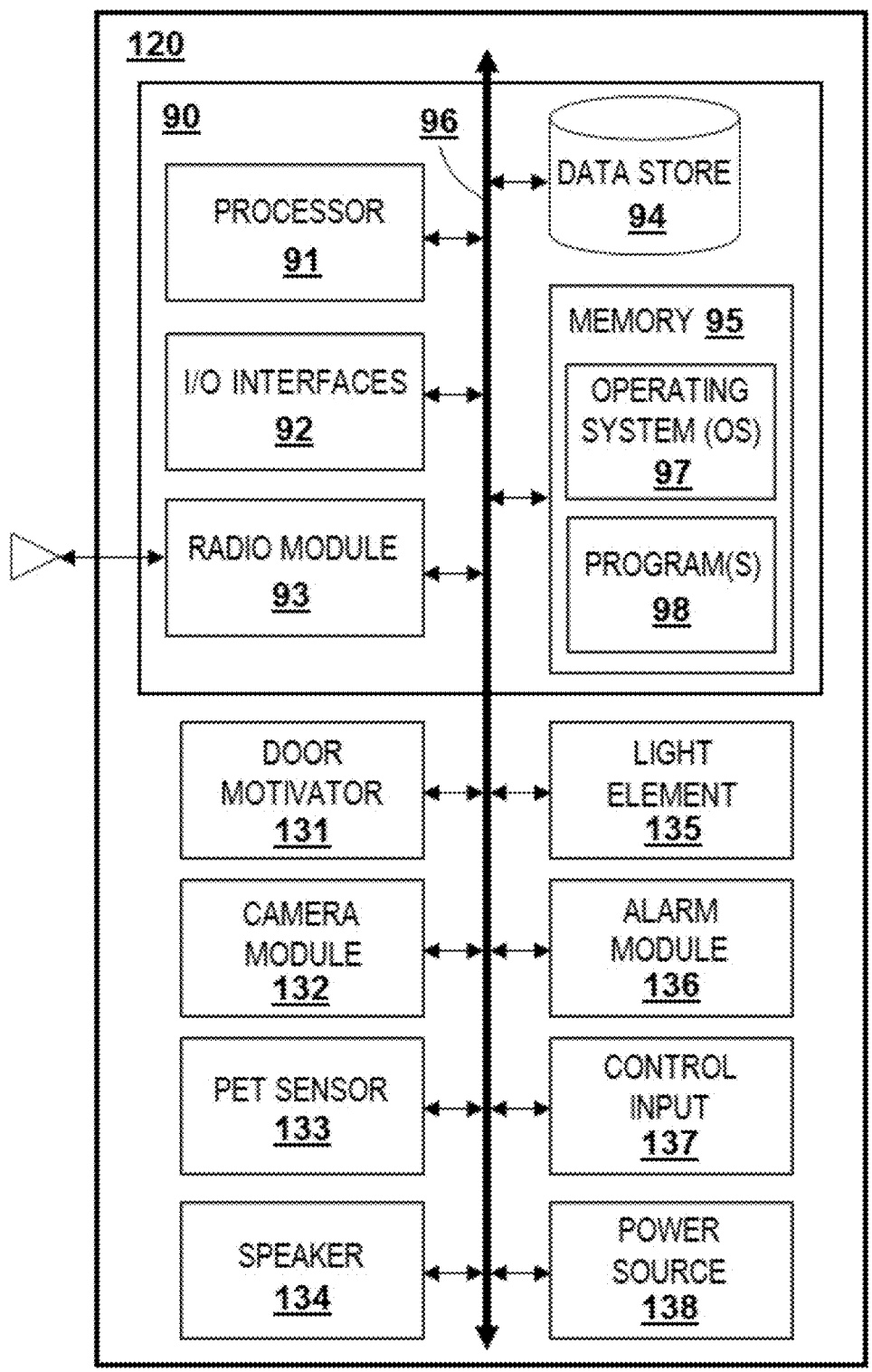
FIG. 4 shows a block diagram illustrating an example of a pet access door device, which may be used by the system as described in various embodiments herein.
Figure 5:
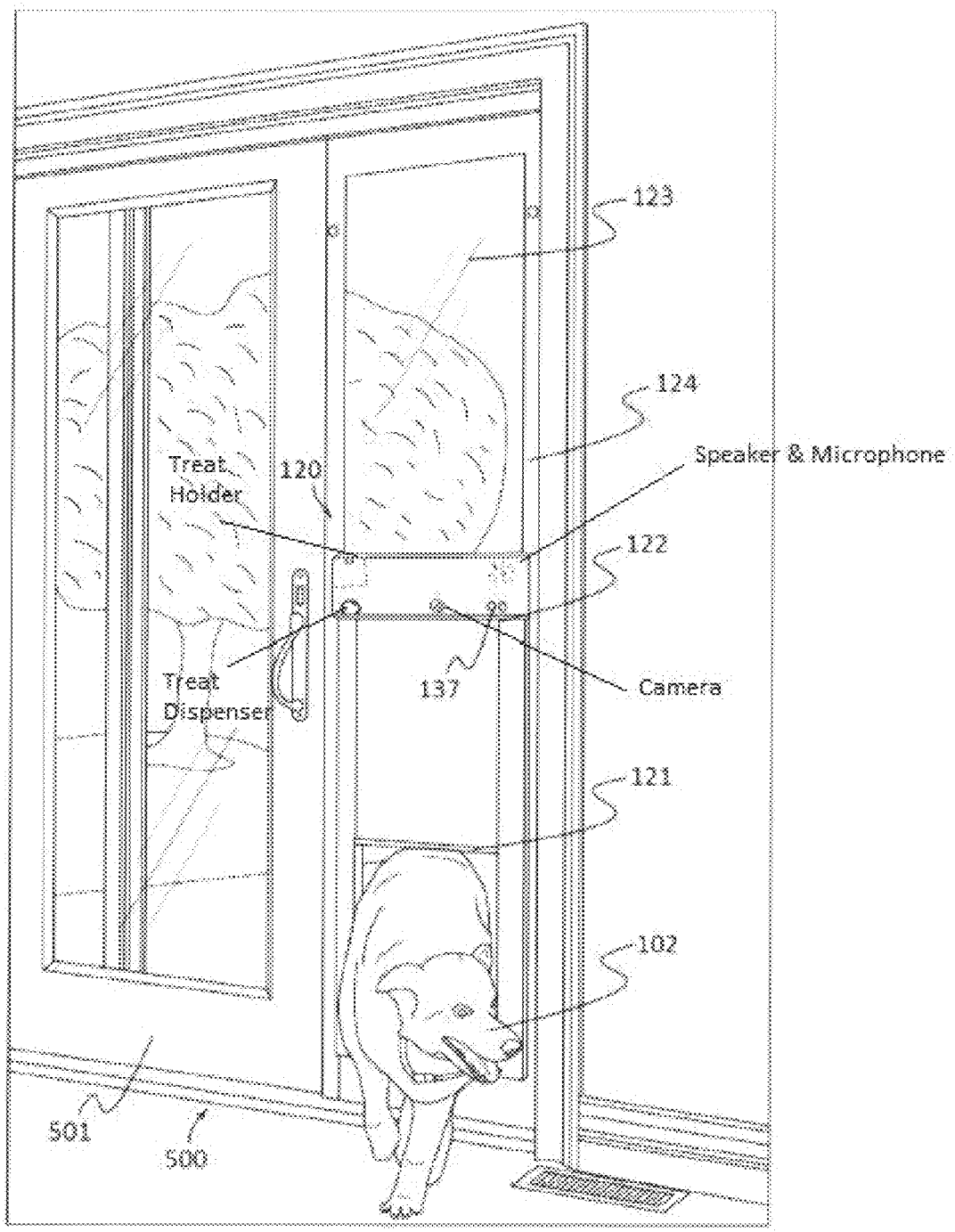
FIG. 5 illustrates a perspective view of an example pet access door device, which may be used by the system as described in various embodiments herein.

FIGS. 4 and 5 depict examples of a pet access door device ("the device") 120 according to various embodiments described herein. In some embodiments, the device 120 can be a digital device that, in terms of hardware architecture, may optionally comprise one or more processing units 90, door motivators 131, camera modules 132, pet sensors 133, speakers 134, light elements 135, alarm modules 136, and/or control inputs 137. It should be appreciated by those of ordinary skill in the art that FIG. 4 depicts an example of the device 120 in an oversimplified manner, and a practical embodiment may include additional components or elements and suitably configured processing logic to support known or conventional operating features that are not described in detail herein.

The components and elements (90, 131, 132, 133, 134, 135, 136, and 137) may be communicatively coupled via a local interface 96. The local interface 96 can be, for example but not limited to, one or more buses or other wired or wireless connections, as is known in the art. The local interface 96 can have additional elements, which are omitted for simplicity; such as: controllers, buffers (caches), drivers, repeaters, and receivers, among many others, to enable communications. Further, the local interface 96 may include address, control, and/or data connections to enable appropriate communications among the aforementioned components.

In some embodiments, a processing unit 90 may comprise one or more processors 91, I/O interfaces 92, radio modules 93, data stores 94, and/or memory 95. The processor 91 is a hardware device for executing software instructions. The processor 91 can be any custom made or commercially available processor, a central processing unit (CPU), an auxiliary processor among several processors, a semiconductor-based microprocessor (in the form of a microchip or chip set), or generally any device for executing software instructions. When in operation, the processor 91 is configured to execute software stored within the memory 95, to communicate data to and from the memory 95, and to generally control operations of the device 120 pursuant to the software instructions. In an exemplary embodiment, the processor 91 may include a mobile optimized processor such as optimized for power consumption and mobile applications.

The I/O interfaces 92 can be used to input and/or output information and power. In some embodiments, I/O interfaces 92 may include one or more turnable control knobs, depressible button type switches, a key pad, slide type switches, dip switches, rocker type switches, rotary dial switches, numeric input switches, or any other suitable input which a user may interact with to provide input. In further embodiments, I/O interfaces 92 may include one or more light emitting elements or other display device, e.g., a LED (light emitting diodes), a speaker, or any other suitable device for outputting or displaying information. The I/O interfaces 92 can also include, for example, a serial port, a parallel port, a small computer system interface (SCSI), an infrared (IR) interface, a radio frequency (RF) interface, a universal serial bus (USB) interface, and the like.

An optional radio module 93 may enable wireless communication to an external access device or network through an antenna. A radio module 93 may comprise a wireless communication receiver and optionally a wireless communication transmitter. In some embodiments, a radio module 93 may operate on a cellular band and may communicate with or receive a Subscriber Identity Module (SIM) card or other wireless network identifier. Any number of suitable wireless data communication protocols, techniques, or methodologies can be supported by the radio module 93, including, without limitation: RF; IrDA (infrared); Bluetooth; ZigBee (and other variants of the IEEE 802.15 protocol); IEEE 802.11 (any variation such as WiFi); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 94 may be used to store data. The data store 94 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 94 may incorporate electronic, magnetic, optical, and/or other types of storage media.

The memory 95 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 95 may incorporate electronic, magnetic, optical, and/or other types of storage media. Note that the memory 95 may have a distributed architecture, where various components are situated remotely from one another, but can be accessed by the processor 92. The software in memory 95 can include one or more software programs, each of which includes an ordered listing of executable instructions for implementing logical functions. In the example of FIG. 4, the software in the memory system 95 may include a suitable operating system (O/S) 97 and programs 98. An operating system 97 essentially controls the execution of input/output interface 90 functions, and provides scheduling, input-output control, file and data management, memory management, and communication control and related services. The operating system 97 may be, for example, LINUX (or another UNIX variant) and any Linux-kernel-based operating systems, Raspbian, Ubuntu, OpenELEC, RISC OS, Arch Linux ARM, OSMC (formerly Raspbmc) and the Kodi open source digital media center, Pidora (Fedora Remix), Puppy Linux, Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), and/or the like. The programs 98 may include various applications, add-ons, etc. configured to provide end user functionality such as to control the operation of functions of one or more door motivators 131, camera module 132, pet sensors 133, speakers 134, light elements 135, alarm modules 136, and/or control inputs 137.

The device 120 may comprise one or more door motivators 131 which may be configured to operate the door 121. Preferably, a door motivator 131 may comprise a locking mechanism that may be electrically operated and/or mechanically operated and which may prevent the door 121 from being back driven or forced open. In further preferred embodiments, a door motivator 131 may be configured to raise the door 121 into an open position and/or lower the door 121 into a closed position. A door motivator 131 may comprise any suitable type of motor or actuator, which may be used for opening and/or closing a door 121. In preferred embodiments, a door motivator 131 may comprise an actuator, which may be operated by a source of energy, typically electric current, hydraulic fluid pressure, or pneumatic pressure, and converts that energy into motion. Examples of actuators may include comb drives, digital micromirror devices, solenoids, electric motors, electroactive polymers, hydraulic cylinders, piezoelectric actuators, pneumatic actuators, servomechanisms, thermal bimorphs, screw jacks, or any other type of hydraulic, pneumatic, electric, mechanical, thermal, and magnetic type of actuator.

In some embodiments, the device 120 may comprise a camera module 32 having a camera, which may be configured to record still images or video images of the environment around the device 120, and preferably of the environment generally located proximate to both sides of the door 121 of the device 120. In preferred embodiments, a camera module 32 may comprise a digital camera that encodes images and videos digitally on a charge-coupled device (CCD) image sensor or on a complementary metal-oxide-semiconductor (CMOS) image sensor and stores them for later reproduction. In other embodiments, a camera module 132 may comprise any type of camera which includes an optical system, typically using a lens with a variable diaphragm to focus light onto an image pickup device or image sensor.

In other embodiments, it is contemplated that the camera can be connected to a software application that can interface with the camera to provide added functionality.

For example, the camera can provide substantially real-time views of the door and the environment surrounding the door by recording at all times. In another example, the video camera can record intermittently or allow a user to designate intermittent segments of a continuously recorded video. The camera can record content in any way device 120 is instructed to based on one or more parameters.

Parameters can include any variable that changes the way the device 120 executes one or more functions. For example, the device 120 can set the camera to record once a motion sensor is triggered. In this example, a pet can trigger a passive infrared motion detector which subsequently instructs the camera to record any motion captured at or in proximity of the door. In another example, the device 120 can set the camera to record when a sound is detected by a microphone, such as a dog barking.

It is contemplated that the camera can be separate component of an overall interactive pet door system or can be combined with any one or more components of the interactive pet door system. It is further contemplated that the camera can store recorded video in any storage medium and using any storage method known in the art. For example, video captured by the camera can be stored internally in a volatile and/or non-volatile memory storage medium. In another example, video captured by the camera can be stored remotely through a network to a remote server, such as a remote server over a cloud computing network or through a hard-wired network.

Device 120 can capture and process any variety of data known in the art to identify one or more trends in the data. For example, device 120 can record the times and dates of each occurrence of a pet door opening. From the collected data, device 120 can determine how the times of day that a pet goes outside of the house varies at different times of the year. In another example, device 120 can determine a pet's regular routine in relieving themselves. Using this data, device 120 can be programmed to unlock the pet door at certain times in during the day to minimize the risk of a pet relieving themselves inside a house.

In some embodiments, the device 120 may comprise a pet sensor 133 which may be configured to determine which side of the door 121 a pet 102 may be located. In some embodiments, a pet sensor 133 may comprise a motion sensor such as a passive infrared motion sensor, microwave motion sensor, ultrasonic motion sensor, tomographic motion sensor, video camera software, or any other type of sensor configured to detect motion of a pet 102. In further embodiments, a pet sensor 133 may comprise an RFID sensor receiver, a magnetic sensor receiver, an Ultraviolet light receiver, an optical receiver, or any other sensor receiver that may be used to detect the presence or absence of a pet 102.

In one example, the device 120 can comprise a motion detector. The motion detector can be operatively coupled to one or more components of the device 120 to provided added functionality. For example, the motion detector can be coupled to a video camera and a light which are substantially simultaneously activated upon the detection of movement by the motion detector.

It is contemplated that one or more motion detector can be activated according to various criteria, including, for example, using two motion sensors to establish a height restriction that singles out pets rather than capturing human activity.

In some embodiments, a network of devices controlled through one or more software programs, such as a smart home system controlled through a smart phone application, can control one or more pet sensors 133 individually or in combination to provide added functionality. In one example, an infrared sensor can be used in conjunction with a pressure sensor to determine which pet is at the device 120. Based on this determination, the device 120 can determine whether or not to let the pet out of the house. For example, the device 120 can allow a dog out of the house but keep a cat in the house based off of information collected from the one or more pet sensors 133.

In embodiments where the device 120 is controlled through a smart home system, it is contemplated that the system at least uses a network connected hub connected to the device 120. It is contemplated that the network connected hub can be communicatively coupled to one or more data stores on a remote server containing stored program instructions, one or more user devices (e.g., smart phones, laptops, tablet computers, etc.), and one or more devices 120.

In one embodiment, the network connected hub is configured to receive transmitted sensor data from the one or more pet sensors 133 associated with the device 120. For example, a proximity sensor can send proximity data indicating the presence of a pet at the door 121. After the network connected hub receive sensor data, the network connected hub can relay the sensor data to a remote computer application on a client device 400 (depicted and explained in further detail in FIG. 4) through the network. For example, the network connected hub can relay the proximity data to a user's smart phone through a computer application via the network. In response to receiving the proximity data, it is contemplated that the user provides a user input associated with one or more program instructions via the computer application. The program instructions can then be sent to the device 120 to cause an action to occur. For example, the user 101 can tap a button on a touch-based graphical user interface to instruct the device 120 to open the door 121.

In other embodiments, the network connected hub can be connected to a remote server with a remote data store. The network connected hub can store, retrieve, or modify stored data and associated program instructions on the remote data store.

In some embodiments, the device 120 may comprise a speaker 134 which may be used to produce a plurality of sounds at a plurality of volume levels. In other embodiments, a speaker 134 may comprise a buzzer, a piezoelectric sound producing device, a dielectric elastomer sound producing device, a buzzer, a moving coil loudspeaker, an electrostatic loudspeaker, an isodynamic loudspeaker, a piezo-electric loudspeaker, or any other device capable of producing one or more sounds. In preferred embodiments, the speaker 134 may be configured to reproduce voice recordings of a user 101 which may be used to lure or entice a pet 102 towards and/or through the door 121.

In some embodiments, the device 120 may comprise a light element 135 which may be configured to illuminate areas on one or both sides of the door 121. Optionally, a light element 135 may be configured as a spot light or a floodlight. In some embodiments, a light element 135 may comprise a light emitting diode (LED), which may be configured to provide light of various wavelengths and intensities. In other embodiments, a light element 135 may comprise an organic light-emitting diode (OLED), incandescent light bulb, fluorescent light, bulb halogen light bulb, high-intensity discharge light bulb, laser light emitter, electroluminescent light source, neon light source, or any other type of suitable light source.

In some embodiments, the device 120 may comprise an alarm module 136 which may be configured to enable the device 120 to detect unauthorized door 121 access such as if the door 121 is forced open. An alarm module 136 may comprise a magnetic sensor that is configured to detect if the door 121 is open, closed, or forced open. In other embodiments, an alarm module 136 may comprise a pressure switch, a read switch, a pressure sensor, a Hall effect sensor, a contact sensor, a button mount, an ambient light sensor, an electrical circuit, or any other method configured to detect if the door 121 is open, closed, or forced open.

It is contemplated that the alarm module 136 can be interconnected with a group of devices connected over a network, such as a smart home system. In one embodiment, alarm module 136 can be programmed to interface with existing home security systems to provide a user with security information and receive program instructions from the user. For example, alarm module 136 can be connected to a smart home system that allows a user to receive a security alert that an unrecognizable figure is present at the pet door and send a picture to the user. In response to the user looking at the picture and seeing that the unrecognizable figure is the user's pet covered in mud, the user can cause the pet door to open to allow the pet into the house. Alternatively, the user can identify that the unrecognizable figure is a pest, such as a raccoon, and engage additional security measures, such as engaging a second lock and turning on a bright light, remotely through a security app to deter the pest from coming near the door.

In some embodiments, the device 120 may comprise one or more control inputs 137 that a user may interact with to control one or more functions of the device 120 such as to lock or unlock the door 121, turn on or to turn off a light element 135 or alarm module. A control input 137 may comprise turnable control knobs, depressible button type switches, a keypad, slide type switches, rocker type switches, or any other suitable input that may be used to modulate electricity between one or more components of the device 120.

In some embodiments, the device 120 may comprise a power source 38 which may provide electrical power to any component of the device 120 that may require electrical power. In preferred embodiments, a power source 138 may provide backup power to allow the device 120 to function and to open and close the door 121 in the event of an electrical grid failure. A power source 138 may comprise a battery, such as a lithium ion battery, nickel cadmium battery, alkaline battery, or any other suitable type of battery, a fuel cell, a capacitor, a super capacitor, or any other type of energy storing and/or electricity releasing device. In further embodiments, a power source 138 may comprise a power cord, kinetic or piezoelectric battery charging device, a solar cell or photovoltaic cell, and/or inductive charging or wireless power receiver.

FIG. 5 illustrates a perspective view of an exemplary pet access door device 120 which may be used by the system 100 according to various embodiments described herein. In some embodiments, the device 120 may comprise a housing 122 having a door 121, which is movable between an open position and a closed position. Housing 122 preferably has a door opener that automatically opens door 121 and closes door 121 in response to some trigger, for example a pet entering the area about the pet door. Housing 122 also generally has a pet door computer system having a processor and a computer-readable medium storing instructions that, when executed by the processor, perform the functions disclosed herein. The pet door computer system could be configured via a local user interface, for example a screen and a keypad (not shown), but is preferably programmed to receive commands from a remote computer application, for example an application running on a user's smart phone. Preferably, the pet door computer system wirelessly connects to a network, such as a local WiFi hotspot/router. Commands could be sent directly to the pet door computer system, but are preferably sent to a server on the Internet, which is used as a proxy service that sends/receives data between the remote computer application and the pet door computer system.

Housing 122 is shown with a speaker, door opener, sensor, and treat dispenser, all coupled to the pet door computer system to collectively be used to interact with the pet and allow the pet to enter the pet door. In some embodiments, the remote computer application is programmed to control the pet door computer system live. For example, a user of the remote computer application could stream information from the camera to the remote computer system (e.g. a smartphone), speak to the pet via the speaker, open the pet door, dispense treats on either side of the pet door, and close the pet door, all in response to remote commands. An exemplary method would be for a user to speak to the pet via the speaker, receive data that the pet has been detected by the sensor (e.g. images from a camera, an indication that a heat signature has been detected by an IR device), transmit a command to open the door, transmit a command to drop a treat on the other side of the door, receive data that the pet has entered the door, and then transmit a command to close the door.

In preferred embodiments, the remote computer application is programmed to allow a user to set up an automated system with a series of dependent triggers to influence the pet to walk through the door. For example, a user could set the pet door computer system up to save one or more phrases on a computer-readable medium (e.g. "Come" "Here boy" "Here's a treat" "Good job" "Mommy loves you") to play in response to a trigger. Such a trigger could be initiated from the remote computer application, or is preferably initiated in response to a detected event, for example a threshold time. When a threshold time is reached (e.g. 9:00 AM, 6:00 PM), the system could play a phrase a given number of times (e.g. once, once every 5 minutes, three times every 10 minutes) that summons the pet to the door. When the pet is detected within an area of the door after the phrase is played, the system could then automatically open the door and close the door when the system detects that the pet has crossed a threshold of the door. In some embodiments, when the pet is detected, another phrase could be played, a treat could be dispensed, or a treat could be dispensed along with the played phrase to entice the pet to walk through the door. Various combinations of sensor detections, phrase playing, and treat dispensations could be automatically programmed into the pet door computer system by a user of the system.

Contemplated sensors include cameras, IR sensors, PIR sensors, microphones, and weight sensors. The pet door computer system could be programmed to initiate an action in response to any threshold reached by any sensor of the system. Where the sensor is an IR sensor, the system is preferably programmed to detect a pet when the IR sensor detects a heat signature above a minimum size and below a maximum size, so as not to confuse one pet with another pet. The user could preferably configure the size by first having the pet stand in front of the sensor and allowing the system to capture the heat signature, and then automatically setting the threshold trigger size to be above and below a pre-set value (e.g. above and below 10% or 20% of the captured size).

The door 121 may be movably coupled to the housing 122 to allow the door 121 to be moved between the open and closed positions. In preferred embodiments, the door 121 may be slidably coupled to the housing 122 so that the door 121 may be retracted into the housing 122 by a door motivator 32 into the open position and extended from the housing 122 into the closed position. In other embodiments, the door 121 may be pivotally coupled, such as with a hinged coupling, to the housing 122 so that the door 121 may be pivoted in a first direction by a door motivator 131 into the open position and pivoted in a second direction into the closed position. In still other embodiments, the door 121 may be movably coupled to the housing with any other suitable coupling method which may allow the door 121 to be moved between an open position and a closed position.

In further embodiments, the device 120 may comprise a soft or flexible flap that may cover the door opening to prevent or reduce airflow through the door 121, such as when the door 121 is in the open position, and which may be pushed or moved be a pet 102 that desired to pass through the door 121. A flexible flap may, preferably, be tinted and may be made from any suitable flexible material including soft or flexible sheets of plastic, silicone, fabrics, or any other flexible material. In preferred embodiments, the device 120 may comprise a soft or flexible flap that may have a magnetic bottom strip closure and pile weather stripping along the opening of the door 121 for a weather-tight seal.

The housing 122 may be coupled to a frame 124 that may be coupled to a building, such as by positioning and securing the frame 124 to a sliding glass door assembly 500 or by coupling the frame 124 within or to a door of the building. When the door 121 is in the open position, a pet 102 may be able to pass through the device 120 to enter or exit a building to which the device 120 is coupled, and when the door 121 is in the closed position, a pet 102 or any other object may not be able to pass through the device 120.

The housing 122 and frame 124 may be configured in any shape, such as a rectangular shape, and may have the door 121 disposed proximate to the lower portions of the device 120 when the device 120 is coupled to a building. In some embodiments and as shown in FIG. 5, frame 124 may be inserted into the frame of a sliding glass door 501 or patio sliding door track so that when the sliding door 501 is closed against the device 120, the device 120 may seal the interior of the building from the exterior or outside. In other embodiments, the frame 124 may be inserted, embedded or otherwise coupled to a pivot-able or hinged door, wall, or any other structure that may be found in a building. For example, an aperture the size of the frame 124 may be cut into a common pivot-able or hinged door and then the frame 124 may be inserted into the aperture and coupled within the pivot-able door to seal the interior of the building from the exterior or outside.

The housing 122 and frame 124 may be made from any durable and rigid material such as aluminum and aluminum alloys. In further embodiments, the housing 122 and frame 124 may be made from or comprise any other type of metal or metal alloy, any type of ceramic, earthenware, natural stone, synthetic stone, various types of hard plastics, such as nylon, acrylic, uPVC, HDPE, melamine, hard rubbers, fiberglass, carbon fiber, resins, such as epoxy resin, wood, other plant based materials, or any other material including combinations of materials that are substantially rigid and suitable for securing and positioning the device 120 to a building. In preferred embodiments, the frame 124, housing 122, and/or door 121 may comprise an insulating material for temperature regulation. In still further embodiments, the frame 124 may comprise a tempered glass or other transparent material panel 123 which may allow the user 101 to look through those portions of the housing 122 such as when the frame 124 is configured as a sliding glass door assembly 500 insert.

Turning now to FIGS. 1, 4-6, the system 100 may include a pet access door device 120 which may be configured to perform various functions and methods which may enable a user 101 or pet owner to move the door 121 between an open position and a closed position so that a pet 102 may be enabled or prevented from passing through the door 121. In some embodiments, the device 120 may be in wired or wireless communication with a network 105 and; therefore, in wired or wireless communication with one or more client devices 400 of a user 101 and/or servers 300. While many of the following functions and methods are described as being enabled via user 101 input provided through a client device 400 to the device 120, the device 120 may include one or more control inputs 137, which may enable the user 101 to control the functions of the device 120 without requiring the use of a client device 400 and/or server 300.

In some embodiments, the device 120 may include one or more programs 98, such as a system rules engine, which may comprise or function as logic stored in the memory 95 and may be executable by the processor 91. The programs 98 and/or a system rules engine may receive input from a user 101 and/or pet 102 via one or more client devices 400, a door motivator 131, a camera module 32, a pet sensor 133, alarm module 136, and/or control inputs 137, and then use the input to modulate a function of a door motivator 131, a camera module 132, a pet sensor 133, speaker 134, light element 135, alarm module 136, and/or control input 137 to perform various functions and methods of the system 100.

Processor 91 can process any type of data received using any method known in the art. In some embodiments, processor 91 can execute one or more programs 98 to use machine learning techniques to process data and synthesize new executable program instructions based on the processed data. For example, the one or more programs 98 can use machine learning techniques including, but not limited to, time-series classifiers, supervised learning classifiers, linear regression analyses, reinforcement learning, clustering, density estimation, and dimensionality reduction.

Based on the trends in the data determined by the one or more programs 98, the executable program instructions associated with the one or more programs 98 can be modified to better adapt to the identified trends. For example, the one or more programs 98 can modify how they control reward systems, the schedule of unlocking/locking the pet door, the timing and types of sounds emitted from the device 120, and how frequently device 120 provides notifications to a user.

It is contemplated that the one or more programs 98 can coordinate different capabilities of the device 120 to execute increasingly more complex functions. For example, the one or more programs 98 can use image recognition techniques to determine specific identifying features of the pet. Using the specific identifying features, one or more programs 98 can use one or more algorithms to differentiate between an authorized pet versus a different dog, even if the two dogs look similar. In this example, the identifying features can comprise the gait of the dog, the coloration of the fur, and specific behavioral patterns. If the one or more programs 98 determine that the identified pet falls within a designated threshold confidence interval, then the one or more programs 98 can send instructions to the device 120 to allow access to the authorized pet.

Figure 6:
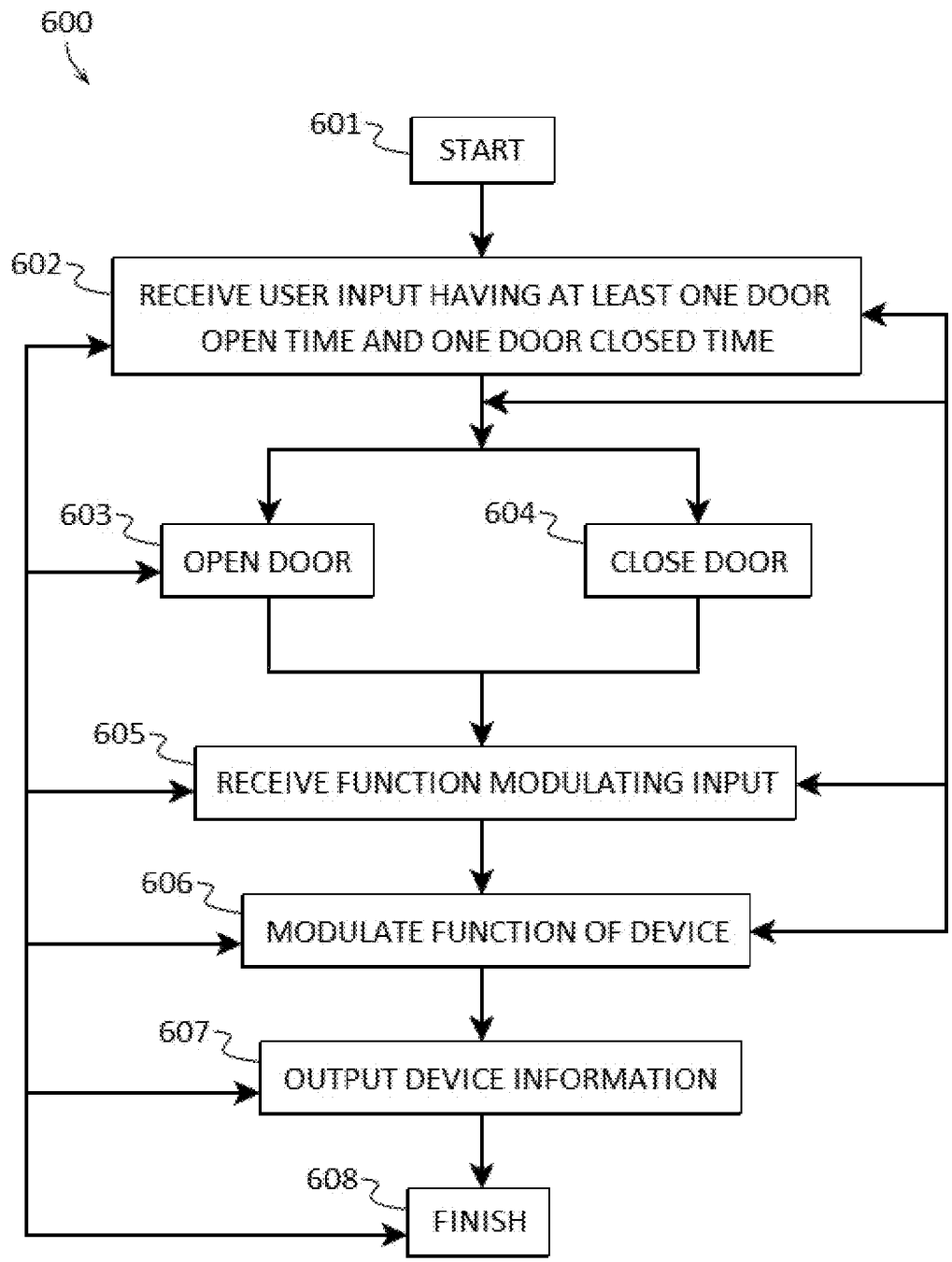
FIG. 6 depicts a block diagram of an example of a method for controlling pet access to an environment according to various embodiments described herein.

FIG. 6 depicts a block diagram of an example of a method for controlling pet access to an environment ("the method") 600 according to various embodiments described herein. The method 600 may enable a user 101 to control a pet's ability to access an outside environment, such as to prevent a pet 102 from exiting a building or home, and/or to control an animal's ability to access an inside environment, such as to prevent a pet 102 from entering a building or home, via a pet access door device 120.

In some embodiments, the method 600 may include receiving user input having at least one door open time and one door closed time in step 602. A door open time may describe a time period or time during which a door motivator 131 is to open or maintain a door 121 in an open position so that a pet 102 may pass through the door 121 to enter or exit a building to which the device 120 is coupled. A door closed time may describe a time period or time during which a door motivator 131 is to close or maintain a door 121 in a closed position so that a pet 102 may not pass through the door 121 to enter or exit a building to which the device 120 is coupled. Optionally, the programs 98 of the device 120 may include a timer or clock feature, which may be used to provide a door open time that coincides with daylight hours and a door closed time that coincides with non-daylight hours.

In embodiments where the method 600 is associated with a network connected hub, the method 600 can include receiving user input regarding the door open time in response to the user 101 receiving sensor data. For example, the user 101 can receive an image from an image sensor of the device 120 and select an option in an associated smart phone application to initiate the door open time. In other embodiments, the method 600 can include receiving user inputs through a network connected device without the user 101 receiving sensor data. For example, the user 101 can use a scheduling function of a smart phone application to remotely change the door open time and the door closed time in substantially real-time.

The method 600 may then proceed to steps 603 and 604. Steps 603 and 604 may be performed in any order. Additionally, while in some embodiments, steps 603 and 604 may occur before steps 605-607, and in other embodiments, step 603 and/or step 604 may occur after step 605, step 606, and/or step 607.

In step 603, a door motivator 131 may open the door 121. In some embodiments, the door 121 may be opened or maintained in an open position at a "door open time" by the programs 98 of the device 120, which causes the processing unit 90 to activate or modulate the door motivator 131. In further embodiments, the door 121 may be opened or maintained in an open position after receiving input provided by a user 101 via their respective client device 400 which may be communicated to the device 120 thereby causing the processing unit 90 to activate or modulate the door motivator 131. In still further embodiments, the door 121 may be opened or maintained in an open position after receiving input provided by a door motivator 131, a camera module 132, a pet sensor 133, alarm module 136, and/or control inputs 137 of the device 120 thereby causing the processing unit 90 to activate or modulate the door motivator 131.

In step 604, a door motivator 131 may close the door 121. In some embodiments, the door 121 may be closed or maintained in a closed position at a door closed time by a program 98 of the device 120 which causes the processing unit 90 to activate or modulate the door motivator 131. In further embodiments, the door 121 may be closed or maintained in a closed position after receiving input provided by a user 101 via their respective client device 400 which may be communicated to the device 120 thereby causing the processing unit 90 to activate or modulate the door motivator 131. In still further embodiments, the door 121 may be closed or maintained in a closed position after receiving input provided by a door motivator 131, a camera module 132, a pet sensor 133, alarm module 136, and/or control inputs 137 of the device 120 thereby causing the processing unit 90 to activate or modulate the door motivator 131.

In step 605, the processor 91 may receive function modulating input. In some embodiments, a processor 91 may receive function modulating input provided by a user 101 via their respective client device 400 which may be communicated to the device 120. For example, the user 101 may use their client device 400 to provide function modulating input to the device 120 for opening or closing the door 121. As another example, the user 101 may use their client device 400 to provide function modulating input to the processor 91 for modulating the function of a camera module 132, a pet sensor 133, a speaker 134, a light element 135, and/or an alarm module 136.

In further embodiments, a processor 91 may receive a function modulating input provided by a user 101 via a control input 137 of the device 120 which may be communicated to processor 91. For example, the user 101 presses or otherwise interacts with a control input 137 to provide function modulating input for opening or closing the door 121. As another example, the user 101 may interact with a control input 137 to provide function modulating input to the device 120 for modulating the function of a camera module 132, a pet sensor 133, a speaker 134, a light element 135, and/or an alarm module 136.

In further embodiments, a processor 91 may receive function modulating input provided by a door motivator 131, a camera module 132, a pet sensor 133, alarm module 136, and/or control inputs 137 of the device 120 thereby causing the processing unit 90 to activate or modulate the door motivator 131. For example, if a door motivator 131 detects an object in the door 121 when it is attempting to close, such as the pet 102, the door motivator 131 may provide function modulating input which may be used to stop the door 121 from closing. As another example, a pet sensor 133 may provide function modulating input which describes if the pet 102 is outside or inside the door 121. As still a further example, a user 102 may provide function modifying input, such as via their client device 400 or a control input 137, for activating the camera module 132, speaker 134, and/or alarm module 136.

In step 606, the processor 91 may modulate a function of the device 120 in step 606. In some embodiments, a processor 91, after receiving function modulating input for opening or closing the door 121 in step 605, may proceed to step 603 or 604, respectively, to open or close the door 121. In further embodiments, a processor 91, after receiving function modulating input provided to modulate the function of a camera module 132, a pet sensor 133, a speaker 134, a light element 135, and/or an alarm module 136 in step 605, the processor 91 may modulate the function of the camera module 132, the pet sensor 133, the speaker 134, the light element 135, and/or the alarm module 136 in step 606.

In some embodiments, the method 600 may include the step of outputting device information 607. Device information may include data provided by a door motivator 131, a camera module 132, a pet sensor 133, a speaker 134, a light element 135, an alarm module 136, and/or a control input 137. For example, device information may include video data recorded by a camera module 132, pet location data recorded by a pet sensor 133, alarm information recorded or created by an alarm module 136, and door position data recorded by a door motivator 131. In some embodiments, the processor 91 may output device information via a control input 137. In further embodiments, the processor 91 may output device information via a network connection 104 to a client device 400, such as to the smart phone of the user 101. Once device information has been outputted, the method 600 may finish 608 or the method 600 may continue to any other step 602-607.

While some materials have been provided, in other embodiments, the elements that comprise the pet access door device 120 such as the housing 122, door 121, optional flexible flap, and/or any other element discussed herein, may be made from durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the device 120 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 120 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, one or more of the elements that comprise the device 120 may be coupled by being one of connected to and integrally formed with another element of the device 120.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A pet door system comprising:
    a speaker configured to emit one or more sounds in response to a first trigger, wherein the first trigger is at least one of a local trigger and a remote trigger;
    an optical sensor configured to detect a visual presence of a pet within a visual threshold associated with a pet door;
    a microphone configured to detect one or more sounds within an auditory threshold associated with the pet door;
    a door motivator configured to open a pet door when at least one of the optical sensor and the microphone detects a pet entering a threshold area around the pet door;
    a proximity sensor configured to detect a proximity of the pet to the pet door;
    one or more computer processors;
    one or more computer readable storage devices; and
    program instructions stored on the one or more computer readable storage devices for execution by at least one of the one or more computer processors, the stored program instructions comprising:
        program instructions to store data associated with at least one pet door event, wherein the pet door event includes recorded data associated with at least one of the speaker, the optical sensor, the microphone, and the door motivator;
        program instructions to receive one or more user-submitted program instructions, wherein the one or more user-submitted program instructions include one or more dependent triggers that control the operation of one or more of the speaker, the optical sensor, the microphone, and the door motivator in response to one or more detected events, and wherein the detected event at least includes a detection of the pet within a threshold proximity of the pet door.

2. The pet door system of claim 1, further comprising a non-transitory computer-readable medium configured to store the one or more sounds as a pre-recorded phrase.

3. The pet door system of claim 2, wherein the pre-recorded phrase is recording using a remote device.

4. The pet door system of claim 1, further comprising an infra-red sensor configured to detect a heat-signature indicative of a pet.

5. The pet door system of claim 1, wherein the optical sensor is configured to transmit a set of captured images to a remote computer application.

6. The pet door system of claim 5, wherein the door motivator is configured to close the pet door in response to a second trigger received from the remote computer application in response to a transmission of the set of captured images.

7. The pet door system of claim 1, wherein the first trigger comprises a clock configured to reach a threshold time.

8. The pet door system of claim 1, wherein the first trigger comprises a signal received from a remote computer application.

9. The pet door system of claim 1, wherein the door motivator is configured to close the pet door in response to the pet crossing a threshold of the pet door, wherein the threshold substantially separates a first space from a second space.

10. The pet door system of claim 1, wherein the pet door system further comprises a treat dispenser configured to dispense at least one treat when the door motivator is in an open configuration.

11. The pet door system of claim 10, wherein the speaker is further configured to play a second phrase when the treat is dispensed by the treat dispenser.

12. The pet door system of claim 11, further comprising a remote computer application configured to receive the second phrase.

13. The pet door system of claim 11, further comprising a non-transitory computer readable medium configured to store the second phrase.

14. The pet door system of claim 10, further comprising a treat holder configured to hold treats to be dispensed by the treat dispenser.

15. The pet door system of claim 1, further comprising:
a computing device;
a network connected hub, wherein the computing device is connected to the network connected hub and the network connected hub is configured to:
receive transmitted sensor data from the computing device;
send the transmitted sensor data to a remote computer application;
receive a user input from the remote computer application through the network connected hub, wherein the user input is associated with one or more program instructions.

16. The pet door system of claim 15, further comprising a remote server having a data store, wherein the remote server is configured to receive and send the transmitted sensor data to the computing device.

17. The pet door system of claim 1, further comprising:
a computing device;
a network connected hub, wherein the computing device is connected to the network connected hub and the network connected hub is configured to:
receive a user input from the remote computer application through the network connected hub, wherein the user input is associated with one or more program instructions.

18. The pet door system of claim 17, further comprising a remote server having a data store, wherein the remote server is configured to receive and send the transmitted sensor data to the computing device.

* * * * *